G. E. PFENNIGHAUSEN & G. OKERFELT.
ARTICLE MADE FROM REED, RATAN, OR SIMILAR MATERIALS.
APPLICATION FILED NOV. 22, 1916.

1,283,289.

Patented Oct. 29, 1918.

INVENTORS
Gothard E. Pfennighausen:
Gust Okerfelt:
BY
ATTORNEY.

UNITED STATES PATENT OFFICE.

GOTHARD E. PFENNIGHAUSEN, OF WETHERSFIELD, AND GUST OKERFELT, OF HARTFORD, CONNECTICUT.

ARTICLE MADE FROM REED, RATAN, OR SIMILAR MATERIALS.

1,283,289.  Specification of Letters Patent.  Patented Oct. 29, 1918.

Application filed November 22, 1916. Serial No. 132,915.

*To all whom it may concern:*

Be it known that we, GOTHARD E. PFENNIGHAUSEN and GUST OKERFELT, both citizens of the United States, and residents, respectively, of Wethersfield and Hartford, both in the county of Hartford and State of Connecticut, have invented certain new and useful Improvements in Articles Made from Reed, Ratan, or Similar Materials, of which the following is a specification.

In the general construction of what is known as wicker work, crosswise or base strands are used in certain portions of the work, and these strands are commonly called stakes. For the finish of an article it is customary to provide flanges or rolls, and these stakes are many times so heavy that it is difficult to bend them and make them retain the desired contour. Our invention contemplates the use of a metal, and preferably a heavy wire form, and the invention is particularly concerned with the manner of connecting this wire form to the end of the stake.

In the drawings—

Figure 1:
Figure 1 is a view of the end of a stake with one of our forms attached thereto.
Figure 2:
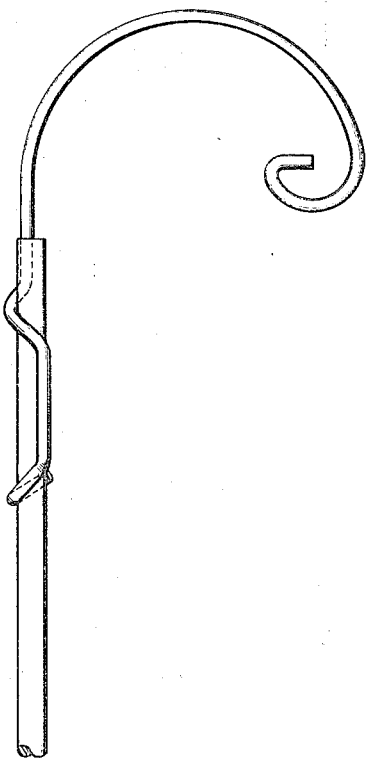
Fig. 2 is a side view thereof.
Figure 3:
Fig. 3 is a view just the reverse of Fig. 1.

Referring to the drawings—it will be seen that the form, which at its outer end can take any shape desired but is shown in what is generally known as a "roll", has a shank with an eye at the end in angular arrangement relative to the shank and preferably standing at less than a right angle thereto. At a short distance from the eye the shank is transversely arched so that the center of the arch is about in alinement with the center of the eye. The arch is in a slightly lower plane than the eye.

In applying the stake, the eye is first slid onto the stake, and then the stem is sprung over the end of the stake so that it lies in the arch. This causes the eye to get a firm bite on the stake and the stem between the eye and the arch binds against the side of the stake, with the result that a firm attachment or hitch is secured which cannot readily be broken while the parts are in this position.

It will be apparent that the stake can be properly positioned before any gripping effect has been produced, thus insuring a much better gripping action than would otherwise be possible.

In accordance with the provisions of the patent statutes we have described the principle of operation of our invention, together with the form which we now consider to represent the best embodiment thereof; but we desire to have it understood that the form shown is only illustrative, and that the invention can be carried out by other means.

We claim as our invention:—

1. The combination with a stake, of a metal form, and means for securing the shank of said form to the end of said stake, said means comprising an eye formed in the shank angularly disposed relative to the length of the stake, and a transverse arch in said shank spaced from said eye and with its axis normally out of alinement with the axis of said eye.

2. The combination with a stake, of a metal form and means for securing the shank of said form to the end of said stake, said means comprising an eye at the end of the shank angularly disposed relative to the length of the stake, the shank adjacent said eye lying at one side of the stake, a transverse arch in the shank adapted by the resiliency of the shank to be sprung over the end of said stake, the shank beyond said arch lying against the opposite side of the stake.

3. The combination with a stake, of a metal form and means for securing the shank of said form to the end of said stake, said means comprising a closed eye formed in the shank and angularly disposed relative to the length of the stake and a transverse arch in the shank spaced from said eye and out of alinement therewith.

4. A metal form adapted for attachment to a stake and comprising a stem provided with a closed eye, an arch formed in the stem at a distance from said eye, the axis of the eye and arch being normally out of alinement, said stem between the eye and arch being at the opposite side of the axis of the eye from that part beyond said arch.

GOTHARD E. PFENNIGHAUSEN.
GUST OKERFELT.

Copies of this patent may be obtained for five cents each, by addressing the "Commissioner of Patents, Washington, D. C."